United States Patent
Wang et al.

(10) Patent No.: US 11,663,088 B2
(45) Date of Patent: May 30, 2023

(54) METHOD, ELECTRONIC EQUIPMENT, AND COMPUTER PROGRAM PRODUCT FOR MANAGING BACKUP DATA

(71) Applicant: EMC IP Holding Company LLC, Hopkinton, MA (US)

(72) Inventors: Yi Wang, Chengdu (CN); Jun Tang, Chengdu (CN); Qingxiao Zheng, Chengdu (CN); Bing Liu, Tianjin (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 73 days.

(21) Appl. No.: 17/411,287

(22) Filed: Aug. 25, 2021

(65) Prior Publication Data

US 2022/0300381 A1    Sep. 22, 2022

(30) Foreign Application Priority Data

Mar. 17, 2021    (CN) .......................... 202110287804.4

(51) Int. Cl.
*G06F 16/00*    (2019.01)
*G06F 11/14*    (2006.01)

(52) U.S. Cl.
CPC ...... *G06F 11/1461* (2013.01); *G06F 11/1448* (2013.01); *G06F 11/1458* (2013.01); *G06F 2201/805* (2013.01)

(58) Field of Classification Search
CPC ............ G06F 11/1461; G06F 11/1448; G06F 11/1458; G06F 2201/805
USPC ........................................................ 707/654
See application file for complete search history.

(56) References Cited

U.S. PATENT DOCUMENTS

| | | | |
|---|---|---|---|
| 9,454,324 B1* | 9/2016 | Madhavapeddi | G06F 3/0604 |
| 11,169,714 B1* | 11/2021 | Li | G06F 16/178 |
| 2005/0177767 A1* | 8/2005 | Furuya | G06F 11/1451 |
| | | | 714/E11.122 |
| 2018/0143774 A1* | 5/2018 | Carson | G06F 11/2071 |
| 2019/0042595 A1* | 2/2019 | Basham | G06F 16/178 |
| 2020/0241754 A1* | 7/2020 | Bett | G06F 9/5077 |
| 2021/0109818 A1* | 4/2021 | Perneti | G06F 11/324 |
| 2021/0240575 A1* | 8/2021 | Mulheren | G06F 11/1456 |

* cited by examiner

*Primary Examiner* — Monica M Pyo
(74) *Attorney, Agent, or Firm* — Chamberlain, Hrdlicka, White, Williams & Aughtry

(57) ABSTRACT

A method, electronic device, and a computer readable medium for managing backup data that includes determining an expiration time of backup data in a data set to be backed up in a source storage device, and determines a priority of the backup data to be migrated in a migration operation to be performed based on the expiration time. The method may also include migrating backup data with the same priority in the data set to be backed up to a target storage device to reduce a write amplification factor of a storage device, and prolong the service life of the storage device.

11 Claims, 4 Drawing Sheets

METHOD, ELECTRONIC EQUIPMENT, AND COMPUTER PROGRAM PRODUCT FOR MANAGING BACKUP DATA

CROSS REFERENCE TO RELATED APPLICATIONS

This application claims priority under 35 U.S.C. § 119 to Chinese Patent Application No. 202110287804.4, filed on Mar. 17, 2021. The contents of Chinese Patent Application No. 202110287804.4 are incorporated by reference in its entirety.

TECHNICAL FIELD

Embodiments of the present disclosure relate to the field of computers, and more particularly, to a method, an electronic device, and a computer program product for managing backup data.

BACKGROUND

In recent years, with the development of computer technologies, people pay more and more attention to the security of data storage. Data backup has gradually become a common technology to ensure data security. With the continuous upgrade of storage devices, users' requirements for storage performance are increasing day by day, which makes users expect to migrate backup data stored in a source storage device to a novel storage device with better storage performance. However, existing backup data migration solutions have many problems, such as low processing efficiency and excessive resource consumption.

SUMMARY OF THE INVENTION

Embodiments of the present disclosure provide a solution for managing backup data.

According to an aspect of the present disclosure, a method for managing backup data is proposed. The method may include determining an expiration time of backup data in a data set to be backed up in a source storage device. The method may further include determining a priority of the backup data to be migrated in a migration operation to be performed based on the expiration time. In addition, the method may also include migrating backup data with the same priority in the data set to be backed up to a target storage device.

According to another aspect of the present disclosure, an electronic device is provided. The electronic device may include: a processor; and a memory storing computer program. The processor runs the computer program instructions in the memory to control the electronic device to perform actions, the actions including: determining an expiration time of backup data in a data set to be backed up in a source storage device; determining a priority of the backup data to be migrated in a migration operation to be performed based on the expiration time; and migrating backup data with the same priority in the data set to be backed up to a target storage device.

According to another aspect of the present disclosure, a computer program product is provided, which is tangibly stored on a non-volatile computer-readable medium and includes machine-executable instructions. The machine-executable instructions, when executed, cause a machine to perform steps of the method in aspects of the present disclosure.

BRIEF DESCRIPTION OF THE DRAWINGS

The above and other objectives, features, and advantages of the present disclosure will become more apparent by describing example embodiments of the present disclosure in more detail with reference to the accompanying drawings, and in the example embodiments of the present disclosure, the same reference numerals generally represent the same components.

The same or corresponding reference numerals in the various drawings represent the same or corresponding portions.

DETAILED DESCRIPTION

The embodiments of the present disclosure will be described in more detail below with reference to the accompanying drawings. Although some embodiments of the present disclosure are illustrated in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the scope of protection of the present disclosure.

In the description of embodiments of the present disclosure, the term "include" and similar terms thereof should be understood as open-ended inclusion, i.e., "including but not limited to." The term "based on" should be understood as "based at least in part on." The term "one embodiment" or "this embodiment" should be understood as "at least one embodiment." The terms "first," "second," and the like may refer to different or the same objects. Other explicit and implicit definitions may also be included below.

The principles of the present disclosure will be described below with reference to several example embodiments shown in the accompanying drawings. Although preferred embodiments of the present disclosure are shown in the accompanying drawings, it should be understood that these embodiments are described only to enable those skilled in the art to better understand and then implement the present disclosure, and are not intended to impose any limitation to the scope of the present disclosure.

Figure 1A:
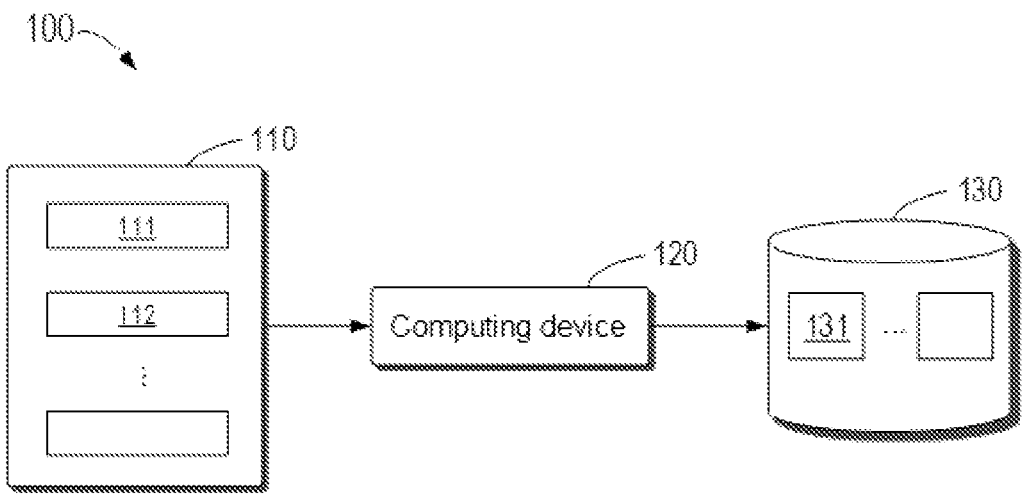
FIG. 1A shows a schematic diagram of an example environment of conventional data migration in accordance with one or more embodiments disclosed herein.

As described above, in order to migrate backup data stored in a source storage device to a target storage device, a computing device is typically provided between the source storage device and the target storage device for migrating the backup data in the source storage device to a plurality of storage areas in the target storage device. FIG. 1A shows a schematic diagram of example environment 100 of conventional data migration. As an example, environment 100 may include source storage device 110, computing device 120, and target storage device 130.

As shown in FIG. 1, source storage device 110 may be a storage device being used by a user for storing backup data. As an example, source storage device 110 may store backup data 111, backup data 112, etc. In addition, target storage device 130 may include a plurality of storage areas 131. For example, each storage area may have a storage space of a predetermined size. Computing device 120 may manage the process of migrating the backup data from source storage device 110 to target storage device 130.

When the backup data is migrated to and saved in target storage device 130, the backup data stored in storage area 131 of target storage device 130 may become invalid due to the expiration of backup. Since target storage device 130 is always uniformly allocated or released in units of storage area 131, the storage space occupied by the expired backup data may be released through a space recovery process (e.g., garbage collection).

Since the backup data stored in the same storage area may have different expiration times, when the expired backup data is cleaned, "holes" may appear in the storage area. For example, in the case where backup data 111 and backup data 112 are stored in storage area 131, if backup data 111 expires, the storage space for storing backup data 111 in storage area 131 will become a "hole." Due to the existence of these "holes," a Write Amplification Factor (WAF) of the target storage device will be increased. In other words, when writing data to target storage device 130, an additional data movement amount that is even several times the amount of data required to write the corresponding data may be required to sort out these "holes." Currently, more and more high-performance storage devices (e.g., solid-state hard drives) are used as target storage device 130. Such high-performance storage device usually has better performance, but its writable count is usually more limited. The usable life of target storage device 130 is seriously affected due to the repeated writing of the storage area caused by the "holes," which is not expected by the user.

Figure 1B:
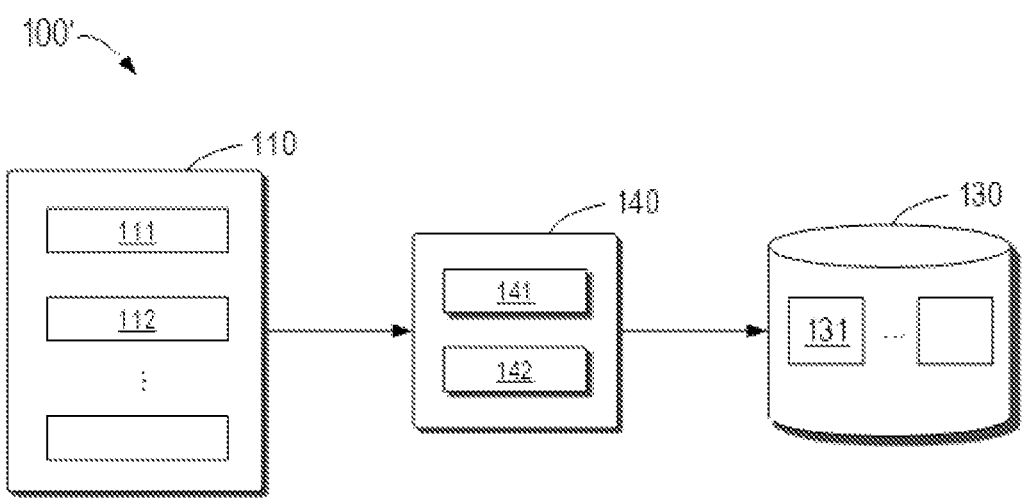
FIG. 1B shows a schematic diagram of an example environment in which one or more embodiments of the present disclosure may be implemented.

For the above and other potential related problems, the present disclosure proposes a solution for managing backup data. FIG. 1B shows a schematic diagram of example environment 100' in which multiple embodiments of the present disclosure can be implemented. FIG. 1B is similar to FIG. 1A, except that computing device 140 in FIG. 1B is used to replace computing device 120 in FIG. 1A. As shown in FIG. 1B, computing device 140 includes grouping module 141 and transmission module 142. When performing backup data migration, grouping module 141 may be configured to determine an expiration time of backup data in a data set to be backed up in source storage device 110, and based on the expiration time of each piece of backup data, determine a priority of the backup data to be migrated in a migration operation to be performed. Thereafter, transmission module 142 may migrate backup data with the same priority in the data set to be backed up to target storage device 130. That is to say, the present disclosure may uniformly migrate backup data with substantially the same expiration time, so the backup data stored in storage area 131 of target storage device 130 may expire almost at the same time, thus avoiding generation of "holes." In order to better understand a backup data management process according to the embodiments of the present disclosure, a flow chart of a process for managing backup data will be described in detail below in conjunction with FIG. 2.

Figure 2:
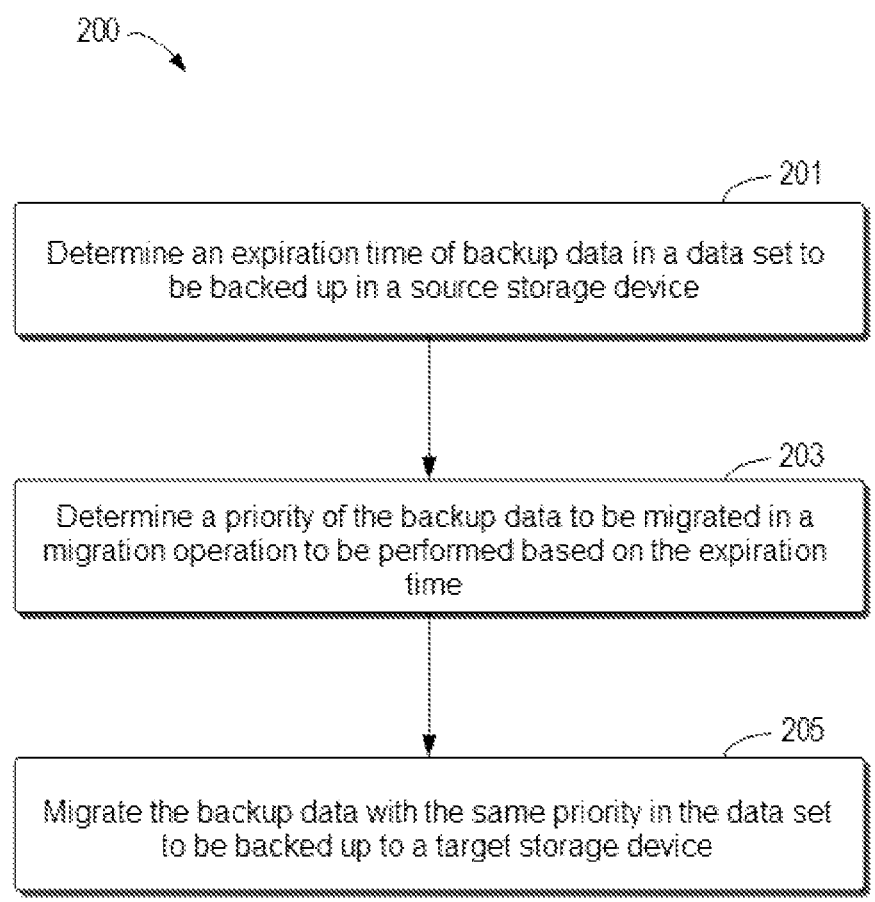
FIG. 2 shows a schematic diagram of a process of managing backup data according to one or more embodiments of the present disclosure.

FIG. 2 shows a schematic diagram of process 200 of managing backup data according to an embodiment of the present disclosure. In some embodiments, process 200 may be implemented in a device shown in FIG. 5. For ease of understanding, specific data mentioned in the following description is illustrative and is not intended to limit the protection scope of the present disclosure.

At 201, computing device 140 may determine an expiration time of backup data in a data set to be backed up in source storage device 110. It should be understood that the expiration time is usually set by a user when the backup data is created. The expiration time may be any length of time. For example, the expiration time may be one week, one month, three months, one hundred days, three hundred days, one year, etc. As an example, when using source storage device 110 for data backup, the user can back up data in the system thereof at a first time so as to create backup data 111, and can back up the data in the system at a subsequent second time so as to create backup data 112, and so on. When the backup data needs to be migrated, computing device 140 may traverse each piece of backup data in source storage device 110 and determine a corresponding expiration time.

At 203, computing device 140 may determine a priority of the backup data to be migrated in a migration operation to be performed based on the expiration time. It should be understood that the priority may be determined based on the expiration time, but the expiration time may not be completely equivalent to the priority. In some embodiments, backup data with similar expiration times may be determined to have the same priority, and in other words, the backup data may be grouped based on the similar expiration times.

In order to group the backup data more effectively, computing device 140 may determine a ratio of the expiration time of each piece of backup data to a reference expiration time. As an example, the reference expiration time may be a maximum expiration time of all pieces of backup data. Then, computing device 140 may determine a priority of backup data to be migrated in a migration operation to be performed based on the ratio.

In some embodiments, computing device 140 may, for example, determine the priority of the backup data based on the following formula (1):

$$\text{Priority} = Int\left(\frac{E\max - E}{E\max} \times N\right) \quad (1)$$

$E_{max}$ represents the maximum expiration time, E represents the expiration time of the backup data, N represents a preset value for determining the granularity of grouping the backup data, and Int represents a rounding function. It should be understood that $E_{max}$ and N are parameters that can be adjusted according to actual needs.

For example, $E_{max}$ is set to 365 (in units of days) and N is set to 5 as an example. If the expiration time of backup data is 100, computing device 140 may determine that the priority of the backup data is Int ((365−100)/365×5)=3. If the expiration time of another piece of backup data is 90, computing device 140 may determine that the priority of the backup data is Int ((365−90)/365×5)=3 at this moment. In this manner, a priority may be determined for each piece of backup data, and the backup data with similar expiration times may be determined to have the same priority, and therefore, the backup data with similar expiration times may be grouped together. It should be understood that the above specific values are only illustrative, any appropriate value may be adopted as the maximum expiration time, and the present disclosure is not intended to limit this.

At 205, computing device 140 may migrate the backup data with the same priority in the data set to be backed up to target storage device 130.

In some embodiments, computing device 140 may add the same label to the backup data with the same priority, and migrate the backup data with the same label to target storage device 130 via a migration channel corresponding to the label. As an example, when backup data 111 and other backup data in source storage device 110 are determined to have the same priority, computing device 140 may group the backup data together and add the same label. Then, computing device 140 may allocate a migration channel for the backup data based on the label, so that the backup data with the same priority are migrated through the same migration channel.

In some embodiments, in order to store the backup data with the same priority in the storage area of target storage device 130, computing device 140 may determine a storage area corresponding to the migration channel from target storage device 130, and migrate the backup data with the same label to the storage area, for example, storage area 131 in FIG. 1. In this way, it can be ensured that backup data with a similar expiration time is stored in each storage area, thereby reducing the generation of "holes." Therefore, the write amplification factor is reduced, and the service life of the storage device is prolonged.

It should be understood that even if the backup data with the same priority is migrated to the same storage area of target storage device 130 as in the foregoing embodiment, "holes" may also be generated in target storage device 130 due to other reasons. For example, FIG. 3 shows a schematic diagram of backup data inside target storage device 130 according to an embodiment of the present disclosure.

Figure 3:
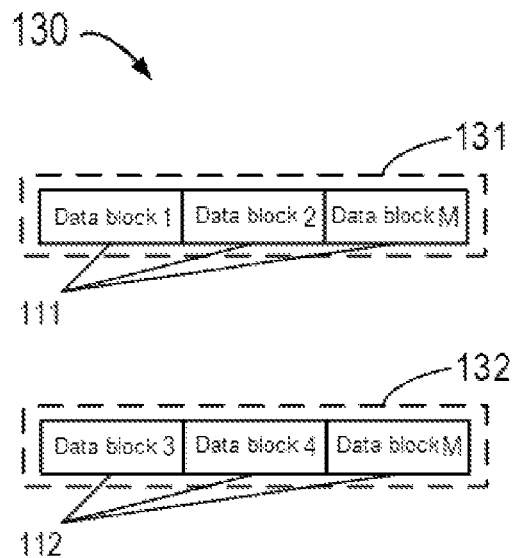
FIG. 3 shows a schematic diagram of backup data inside a storage device according to one or more embodiments of the present disclosure.

As shown in FIG. 3, migrated backup data 111 and backup data 112 are stored in target storage device 130, where backup data 111 is stored in storage area 131 and backup data 112 is stored in storage area 132. In addition, backup data 111 includes data block 1, data block 2, and data block M, and backup data 112 includes data block 3, data block 4, and data block M. Since target storage device 130 stores repeated backup data only once, data block M of backup data 112 only includes a reference relationship with respect to data block M of backup data 111. If backup data 111 and other backup data in storage area 131 expire, target storage device 130 will recycle storage area 131. However, since data block M of backup data 111 is in the state of being referenced, data block M cannot be deleted, which generates a "hole."

Figure 4:
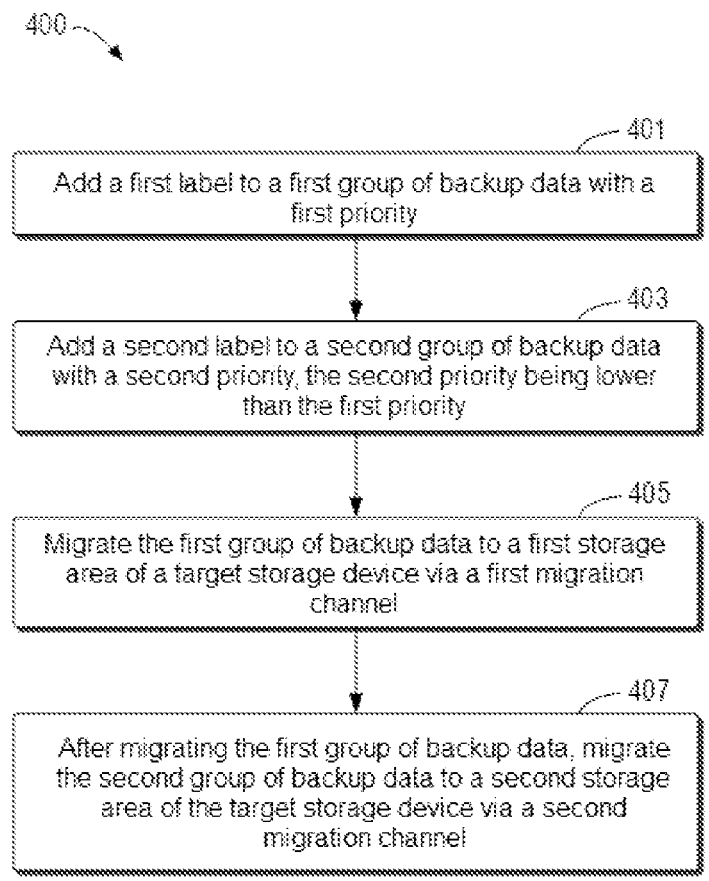
FIG. 4 shows a schematic diagram of an alternative process of managing backup data according to one or more embodiments of the present disclosure.

In order to reduce or even avoid the generation of such "holes," it is necessary to perform refined management of backup data in a backup data migration process. FIG. 4 shows a schematic diagram of alternative process 400 of managing backup data according to an embodiment of the present disclosure. In some embodiments, process 400 may be implemented in a device shown in FIG. 5. For ease of understanding, specific data mentioned in the following description is illustrative and is not intended to limit the protection scope of the present disclosure.

At 401, computing device 140 may add a first label to a first group of backup data with a first priority. As an example, when backup data 111 and part of the backup data in source storage device 110 are determined to have the same priority, computing device 140 may group the backup data together and add the first label, so that the backup data with the same priority is migrated via the same migration channel.

At 403, computing device 140 may add a second label to a second group of backup data with a second priority, the second priority being lower than the first priority. As an example, when backup data 112 and part of the backup data in source storage device 110 are determined to have the same priority, computing device 140 may group the backup data together and add the second label. Since the first priority is different from the second priority, the first label is different from the second label. In addition, since the second priority is lower than the first priority, the expiration time of the first group of backup data is longer than the expiration time of the second group of backup data.

Next, at 405, computing device 140 may migrate the first group of backup data to a first storage area of target storage device 130 via a first migration channel. The first migration channel corresponds to the first label, and may be configured to be dedicated to the task of migrating the backup data including the first label.

At 407, computing device 140 may migrate the second group of backup data to a second storage area of target storage device 130 via a second migration channel after migrating the first group of backup data. The second migration channel corresponds to the second label, and may be configured to be dedicated to the task of migrating the backup data including the second label. Since the second storage area is different from the first storage area, target storage device 130 may release a storage space in units of storage areas. In this way, by first migrating the backup data with a longer expiration time, the situation where a referenced data block expires first can be avoided.

In some embodiments, in order to store the backup data more efficiently, the foregoing second group of backup data may include a reference relationship with respect to part of the backup data in the first group of backup data. As an example, after the migration of the first group of backup data is completed, if data blocks in the second group of backup data are the same as data blocks in the first group of backup data, only the corresponding reference relationship may be stored, thereby improving storage efficiency. And there is no need to worry about the situation where a referenced data block expires first, thereby reducing the generation of "holes."

It should be understood that the storage efficiency of the backup data stored in source storage device 110 may also be improved through storing the reference relationship. When the backup data is migrated, a data block to be migrated may be determined or restored based on the reference relationship among various pieces of backup data, and the backup data including the data block may be migrated to target storage device 130.

In addition, the backup data may also be grouped more finely based on the expiration times. As an example, computing device 140 may determine the backup data with the same expiration time from the backup data with the same priority, and migrate the backup data with the same expiration time to the same storage area in the target storage device. Alternatively or additionally, computing device 140 may also first acquire backup data with the same or similar priority, and write the backup data with the same or similar priority into the same storage area of target storage device 130.

Through the foregoing embodiments, the generation of "holes" in the storage area can be alleviated or avoided without affecting the normal operation of target storage device 130. As a result, the write amplification factor can be significantly reduced, and the performance of the storage device can be improved. In addition, due to the reduction of the write amplification factor, the number of write operations and erase operations required to write the same amount of data is minimized, so the service life of the storage device can be effectively prolonged.

Figure 5:
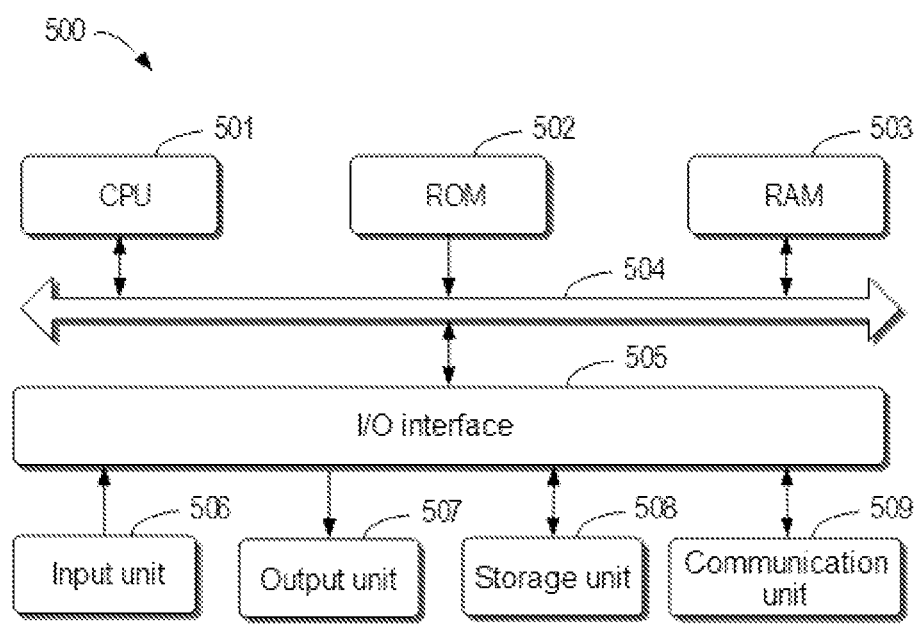
FIG. 5 shows a schematic block diagram of an example device suitable for use to implement one or more embodiments of the present disclosure.

FIG. 5 shows a schematic block diagram of example device 500 suitable for use to implement embodiments of the present disclosure. As shown in the figure, device 500 includes central processing unit (CPU) 501 that may perform various appropriate actions and processing according to computer program instructions stored in read-only memory (ROM) 502 or computer program instructions loaded from storage unit 508 into random access memory (RAM) 503. In RAM 503, various programs and data required for the operation of device 500 may also be stored. CPU 501, ROM 502, and RAM 503 are connected with each other through bus 504. Input/output (I/O) interface 505 is also connected to bus 504.

Multiple components in device 500 are connected to I/O interface 505, including: input unit 506, such as a keyboard and a mouse; output unit 507, such as various types of displays and speakers; storage unit 508, such as a magnetic disk and an optical disk; and communication unit 509, such as a network card, a modem, and a wireless communication transceiver. Communication unit 509 allows device 500 to exchange information/data with other devices through a computer network such as the Internet and/or various telecommunication networks.

The various processes and processing described above, for example, processes 200 and/or 400, may be performed by processing unit 501. For example, in some embodiments, processes 200 and/or 400 may be implemented as a computer software program that is tangibly included in a machine-readable medium such as storage unit 508. In some embodiments, part or all of the computer program may be loaded and/or installed to device 500 via ROM 502 and/or communication unit 509. When the computer program is loaded into RAM 503 and executed by CPU 501, one or more actions of processes 200 and/or 400 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, state setting data, or source code or object code written in any combination of one or more programming languages, the programming languages including object-oriented programming languages, such as Smalltalk, C++, and the like, and conventional procedural programming languages, such as the C language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer may be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or block diagrams and combinations of blocks in the flow charts and/or block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner, such that the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms as used herein is intended to best explain the principles and practical applications of the various embodiments or technical improvements to technologies on the market, or to enable other persons of ordinary skill in the art to understand the embodiments disclosed here.

The invention claimed is:

1. A method for managing backup data, comprising:
   determining an expiration time of backup data in a data set to be backed up in a source storage device;
   determining a priority of the backup data to be migrated in a migration operation to be performed based on the expiration time; and
   migrating backup data with the same priority in the data set to be backed up to a target storage device, wherein migrating backup data with the same priority to the target storage device comprises:
   adding a first label to a first group of backup data with a first priority;
   adding a second label to a second group of backup data with a second priority, the second priority being lower than the first priority;
   migrating the first group of backup data to a first storage area of the target storage device via a first migration channel, the first migration channel corresponding to the first label; and
   after migrating the first group of backup data, migrating the second group of backup data to a second storage area of the target storage device via a second migration channel, the second migration channel corresponding to the second label, and the second storage area being different from the first storage area.

2. The method according to claim 1, wherein determining the priority based on the expiration time comprises:
   determining a ratio of the expiration time to a reference expiration time; and
   determining the priority based on the ratio.

3. The method according to claim 1, wherein the second group of backup data comprises a reference relationship with respect to part of the backup data in the first group of backup data.

4. The method according to claim 1, wherein migrating backup data with the same priority to the target storage device comprises:
   determining backup data with the same expiration time from the backup data with the same priority; and
   migrating the backup data with the same expiration time to the same storage area in the target storage device.

5. An electronic device, comprising:
   at least one processing unit; and
   at least one memory coupled to the at least one processing unit and storing machine-executable instructions that, when executed by the at least one processing unit, cause the device to perform actions comprising:
   determining an expiration time of backup data in a data set to be backed up in a source storage device;
   determining a priority of the backup data to be migrated in a migration operation to be performed based on the expiration time; and
   migrating backup data with the same priority in the data set to be backed up to a target storage device, wherein migrating backup data with the same priority to the target storage device comprises:
   adding a first label to a first group of backup data with a first priority;
   adding a second label to a second group of backup data with a second priority, the second priority being lower than the first priority;
   migrating the first group of backup data to a first storage area of the target storage device via a first migration channel, the first migration channel corresponding to the first label; and
   after migrating the first group of backup data, migrating the second group of backup data to a second storage area of the target storage device via a second migration channel, the second migration channel corresponding to the second label, and the second storage area being different from the first storage area.

6. The device according to claim 5, wherein determining the priority based on the expiration time comprises:
   determining a ratio of the expiration time to a reference expiration time; and
   determining the priority based on the ratio.

7. The device according to claim 5, wherein the second group of backup data comprises a reference relationship with respect to part of the backup data in the first group of backup data.

8. The device according to claim 5, wherein migrating backup data with the same priority to the target storage device comprises:
    determining backup data with the same expiration time from the backup data with the same priority; and
    migrating the backup data with the same expiration time to the same storage area in the target storage device.

9. A non-transitory computer readable medium comprising computer readable program code, which when executed by a computer processor enables the computer processor to perform a method for managing backup data, the method comprising:
    determining an expiration time of backup data in a data set to be backed up in a source storage device;
    determining a priority of the backup data to be migrated in a migration operation to be performed based on the expiration time; and
    migrating backup data with the same priority in the data set to be backed up to a target storage device, wherein migrating backup data with the same priority to the target storage device comprises:
        adding a first label to a first group of backup data with a first priority;
        adding a second label to a second group of backup data with a second priority, the second priority being lower than the first priority;
        migrating the first group of backup data to a first storage area of the target storage device via a first migration channel, the first migration channel corresponding to the first label; and
        after migrating the first group of backup data, migrating the second group of backup data to a second storage area of the target storage device via a second migration channel, the second migration channel corresponding to the second label, and the second storage area being different from the first storage area.

10. The non-transitory computer readable medium of claim 9, wherein determining the priority based on the expiration time comprises:
    determining a ratio of the expiration time to a reference expiration time; and
    determining the priority based on the ratio.

11. The non-transitory computer readable medium of claim 9, wherein the second group of backup data comprises a reference relationship with respect to part of the backup data in the first group of backup data.

* * * * *